(12) United States Patent
Raetz et al.

(10) Patent No.: US 11,605,937 B2
(45) Date of Patent: Mar. 14, 2023

(54) WIRE TROUGHS FOR INSIDE CORNERS

(71) Applicant: Hubbell Incorporated, Shelton, CT (US)

(72) Inventors: Matthew David Raetz, Belleview, IL (US); Donald Wayne Nicholas, III, Staunton, IL (US); Steven Johnson, Buchanan, MI (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 17/199,590

(22) Filed: Mar. 12, 2021

(65) Prior Publication Data

US 2021/0296867 A1    Sep. 23, 2021

Related U.S. Application Data

(60) Provisional application No. 62/992,360, filed on Mar. 20, 2020.

(51) Int. Cl.
*H02G 3/04*        (2006.01)

(52) U.S. Cl.
CPC ......... *H02G 3/0425* (2013.01); *H02G 3/0418* (2013.01)

(58) Field of Classification Search
CPC ......... H02G 3/085; H02G 3/083; H02G 3/20; H02G 3/081; H02G 3/0691; H02G 3/14; H02G 3/086; H02G 3/123; H02G 3/18; H02G 3/10; H02G 3/0616; H02G 3/088; H02G 3/126; H02G 3/12; H02G 3/125; H02G 3/121; H02G 3/08; H02G 3/0675; H02G 3/22; H02G 1/00; H02G 3/16; H02G 3/0683; H02G 3/06; H02G 15/10; H02G 3/00; H02G 3/185; H02G 15/04; H02G 3/263; H02G 9/10; H02G 15/013; H02G 3/381; H02G 3/0437; H02G 3/0608; H02G 3/065; H02G 3/0666; H02G 1/08; H02G 1/14; H02G 15/043; H02G 3/0625; H02G 3/0641; H02G 3/281; H02G 3/388; H02G 15/046; H02G 3/0431; H02G 3/0493; H02G 3/0658; H02G 3/105; H02G 3/128; H02G 3/34; H02G 5/08; H02G 15/007; H02G 15/08; H02G 15/117; H02G 15/16; H02G 3/02; H02G 3/04; H02G 3/0412; H02G 3/0418; H02G 3/0462; H02G 3/283;
(Continued)

(56) References Cited

U.S. PATENT DOCUMENTS 3,120,574 A * 2/1964 Wesson, Jr. .......... H02G 3/0418
174/101
3,858,614 A * 1/1975 Moore .................... F16L 57/00
138/105
(Continued)

FOREIGN PATENT DOCUMENTS

DE        8412625          7/1984
EP        0508192 A2 *     2/1992    .......... H02G 3/0418

*Primary Examiner* — Krystal Robinson
(74) *Attorney, Agent, or Firm* — Ruggiero, McAllister & McMahon LLC

(57) ABSTRACT

A wire trough is provided that includes a main body, caps closing ends of the main body, and a cover. The main body has four longitudinally extending walls defining an access opening between edges of two of the four walls. The cover selectively close the access opening.

20 Claims, 14 Drawing Sheets

(58) Field of Classification Search
CPC ........ H02G 3/30; H02G 3/386; H02G 3/0425; A47B 77/08; A47B 95/002; H01R 13/518; H01R 13/73; H01R 25/006
USPC ..................................................... 439/535
See application file for complete search history.

(56) References Cited

U.S. PATENT DOCUMENTS

| | | | | |
|---|---|---|---|---|
| 3,890,459 | A * | 6/1975 | Caveney | H02G 3/045 174/101 |
| 4,406,379 | A | 9/1983 | Anderson et al. | |
| 5,122,069 | A * | 6/1992 | Brownlie | H02G 3/185 174/53 |
| 5,349,134 | A * | 9/1994 | Russell | F21S 8/033 174/492 |
| 5,709,249 | A * | 1/1998 | Okada | H02G 3/0418 138/162 |
| 5,986,212 | A * | 11/1999 | Lhota | H02G 3/0437 174/68.3 |
| 6,012,683 | A * | 1/2000 | Howell | F16L 3/26 174/101 |
| 6,137,057 | A | 10/2000 | Gutgsell | |
| 6,164,996 | A * | 12/2000 | Yu | H01R 25/003 439/216 |
| 6,216,746 | B1 * | 4/2001 | Guebre-Tsadik | H02G 3/0418 138/155 |
| 6,437,243 | B1 | 8/2002 | Vandervelde et al. | |
| 7,156,694 | B1 * | 1/2007 | Anderson | H01R 25/16 439/535 |
| 7,525,044 | B2 * | 4/2009 | Howell | H02G 3/0418 138/155 |
| 8,341,810 | B2 * | 1/2013 | Rayos | F16B 5/0664 224/326 |
| 8,704,093 | B2 * | 4/2014 | Asztalos | H02G 3/0418 174/68.3 |
| 9,178,342 | B2 * | 11/2015 | Rodenberg | H02G 3/0425 |
| 9,627,873 | B2 * | 4/2017 | Makwinski | H02G 3/26 |
| 9,640,960 | B2 * | 5/2017 | Makwinski | H02G 3/0608 |
| 9,731,665 | B2 * | 8/2017 | Wakabayashi | B60R 16/0215 |
| 10,181,675 | B1 * | 1/2019 | Anderson | A47B 95/002 |
| 10,971,910 | B2 * | 4/2021 | Broere | H02G 3/0493 |
| 2007/0044988 | A1 * | 3/2007 | VanderVelde | H02G 3/0608 174/72 A |
| 2007/0191755 | A1 * | 8/2007 | Sellis | G01D 11/245 604/15 |
| 2008/0110671 | A1 | 5/2008 | Freeman et al. | |
| 2012/0247804 | A1 * | 10/2012 | Rodenberg | H02G 3/0425 174/68.3 |
| 2012/0286110 | A1 * | 11/2012 | Hill | H02G 3/0418 248/74.2 |
| 2015/0111423 | A1 * | 4/2015 | Broere | H01R 13/5213 439/527 |
| 2017/0125991 | A1 * | 5/2017 | Korcz | H02G 3/16 |

* cited by examiner

WIRE TROUGHS FOR INSIDE CORNERS

CROSS REFERENCE TO RELATED APPLICATIONS

This application claims the benefit of U.S. Provisional No. 62/992,360 filed on Mar. 20, 2020, the contents of which are incorporated by reference herein.

BACKGROUND

1. Field of the Invention

The present disclosure is related to wire troughs. More particularly, the present disclosure is related to wire troughs for inside corners.

2. Description of Related Art

Wires for conveying power and/or communication signals (e.g., audio, video, data) in the form of electrical and/or optical signals are known. It is often the case that these wires are not installed in the wall, but rather are installed inside of the room or commercial space.

It is often desired for the wires to be concealed or protected within a conduit or pipe. Further, it is also often desired to install the conduit at the point where two walls or a wall and a ceiling/ceiling form an internal angle, known as an inside corner. In applications where the conduit changes direction, it has been common to use sweep elbows or bent conduit.

However, it has been determined by the present disclosure that both solutions can cause difficulties in feeding wire. Further, it has been determined by the present disclosure that adding elbows or bending conduit at the correct location can be difficult and time consuming.

Further, it has been determined by the present disclosure that prior art conduits that are closed at their periphery—such as pipes—can cause difficulties in pulling wire through the conduit. These closed conduits can also cause difficulties when later adding new wires to or removing unused wires from the conduit.

Accordingly, it has been determined by the present disclosure that is a continuing need for wire troughs that overcome, alleviate, and/or mitigate one or more of the aforementioned and other deleterious effects of prior art conduits.

SUMMARY

Wire troughs for inside corners are provided that remove the need to bend or add elbows as in prior art conduits. Wire troughs for inside corners are also provided that make feeding wire through easier the possible with prior art conduits. Further, wire troughs for inside corners are provided that are sized and configured for use a junction box and/or a splitter box where a main trough entry or entries can be split into multiple exits.

A wire trough is provided that includes a main body, caps closing ends of the main body, and a cover. The main body has four longitudinally extending walls defining an access opening between edges of two of the four walls. The cover selectively close the access opening.

In some embodiments either alone or together with any one or more of the aforementioned and/or after-mentioned embodiments, the caps are formed integrally with the main body or are removably secured to the main body.

In some embodiments either alone or together with any one or more of the aforementioned and/or after-mentioned embodiments, the wire trough further includes one or more knockouts on main body, the cap, the cover, and any combinations thereof.

In some embodiments either alone or together with any one or more of the aforementioned and/or after-mentioned embodiments, the main body includes only three angled regions.

In some embodiments either alone or together with any one or more of the aforementioned and/or after-mentioned embodiments, the three angled regions are each ninety degrees.

In some embodiments either alone or together with any one or more of the aforementioned and/or after-mentioned embodiments, the cover includes two bent regions that are secured to the two of the two of the four walls defining the edges.

In some embodiments either alone or together with any one or more of the aforementioned and/or after-mentioned embodiments, the caps are angled caps.

In some embodiments either alone or together with any one or more of the aforementioned and/or after-mentioned embodiments, the cover includes a hinge.

In some embodiments either alone or together with any one or more of the aforementioned and/or after-mentioned embodiments, the cover has a single ninety degree bend defining legs that are perpendicular to one another. The legs are secured to the two of the two of the four walls defining the edges.

In some embodiments either alone or together with any one or more of the aforementioned and/or after-mentioned embodiments, the caps are parallelogram caps.

In some embodiments either alone or together with any one or more of the aforementioned and/or after-mentioned embodiments, the main body, caps, and cover are formed of carbon steel or galvanized steel.

In some embodiments either alone or together with any one or more of the aforementioned and/or after-mentioned embodiments, the main body, caps, and cover further include paint or powder coating.

A wire trough is also provided that includes a main body, caps closing ends of the main body, and a cover. The main body consists of four longitudinally extending walls defining an access opening between edges of two of the four walls. The four longitudinally extending walls have three corners each at ninety degrees so that adjacent walls are perpendicular to one another. The cover is securable to the main body to selectively close the access opening.

In some embodiments either alone or together with any one or more of the aforementioned and/or after-mentioned embodiments, the caps are angled caps and the cover includes a pair of bent regions. The bent regions are secured to the two of the two of the four walls defining the edges.

In some embodiments either alone or together with any one or more of the aforementioned and/or after-mentioned embodiments, the cover includes a hinge.

In some embodiments either alone or together with any one or more of the aforementioned and/or after-mentioned embodiments, the caps are parallelogram caps and the cover has a single ninety degree bend defining legs that are perpendicular to one another. The legs are secured to the two of the two of the four walls defining the edges.

In some embodiments either alone or together with any one or more of the aforementioned and/or after-mentioned embodiments the main body is configured to selectively receive either angled caps and the cover comprising a pair of bent regions secured to the two of the two of the four walls defining the edges to define an angled trough or parallelogram caps and the cover having a single ninety degree bend defining legs that are perpendicular to one another and secured to the two of the two of the four walls defining the edges to define a parallelogram trough.

In some embodiments either alone or together with any one or more of the aforementioned and/or after-mentioned embodiments, the wire trough further includes one or more knockouts on main body, the cap, the cover, and any combinations thereof.

The above-described and other features and advantages of the present disclosure will be appreciated and understood by those skilled in the art from the following detailed description, drawings, and appended claims.

DETAILED DESCRIPTION

Figure 1B:
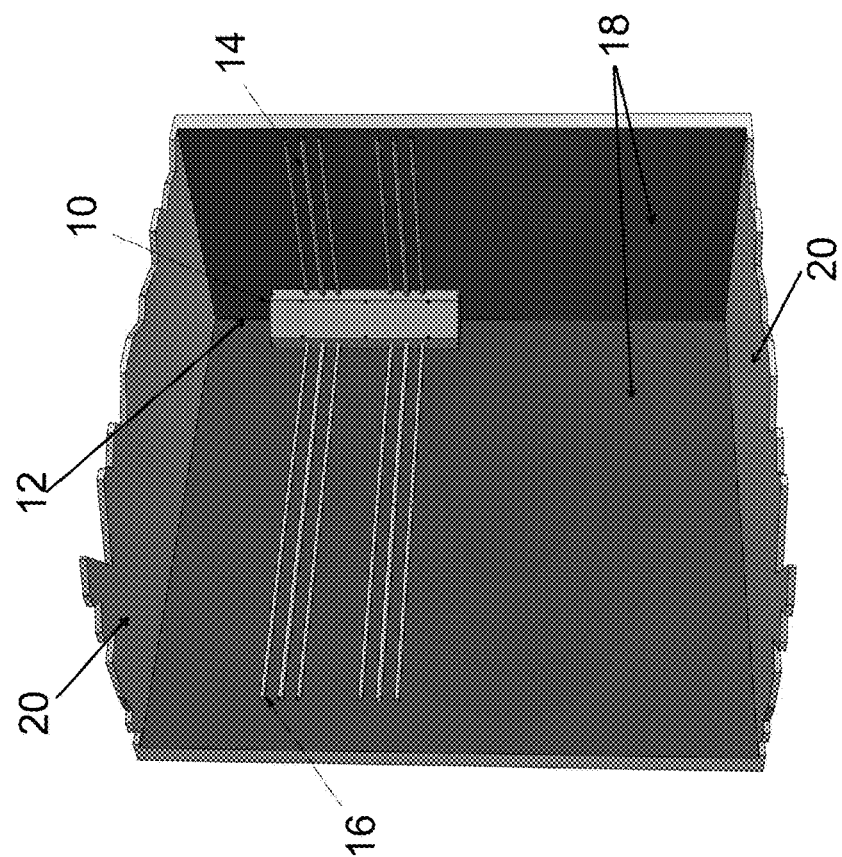
FIGS. 1a-1d are perspective views of an exemplary embodiment of a wire trough according to the present disclosure in different assembled configurations.

Referring to the drawings and in particular to FIGS. 1a-d, an exemplary embodiment of a wire trough according to the present disclosure is shown and is generally referred to by reference numeral 10 in different assembled configurations.

Advantageously, trough 10 is configured for fitment into an inside corner 12. Trough 10 allows changing direction of one or more first conduits 14 and one or more second conduits 16 without the need for elbows or bending of the conduits. Thus, trough 10 can, in some embodiments, be sized and configured for use a junction box and/or a splitter box.

Figure 1A:
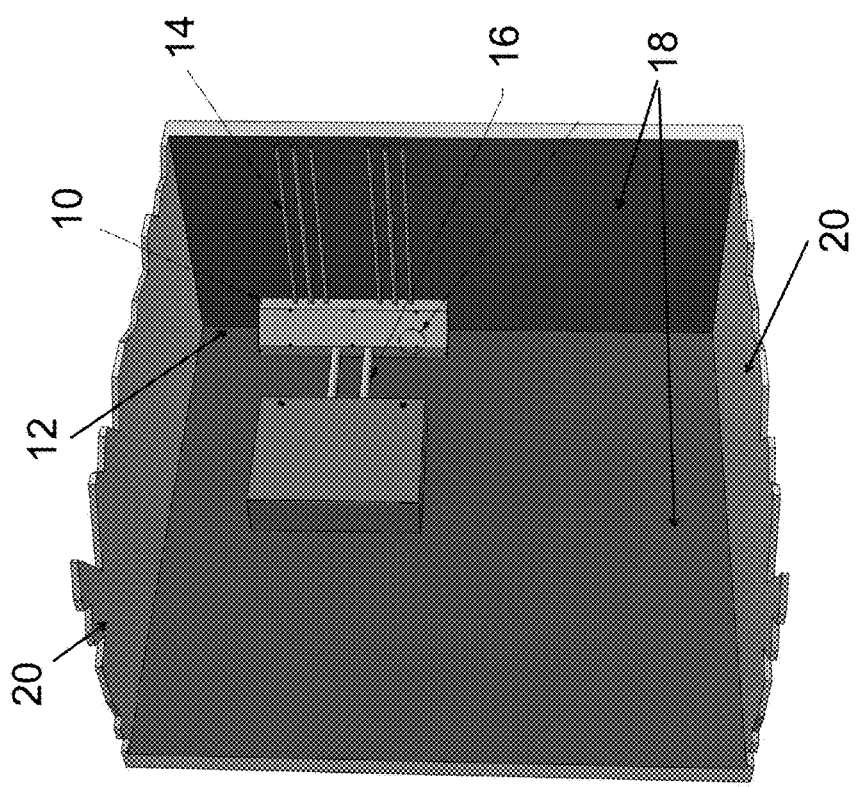
Figure 1D:
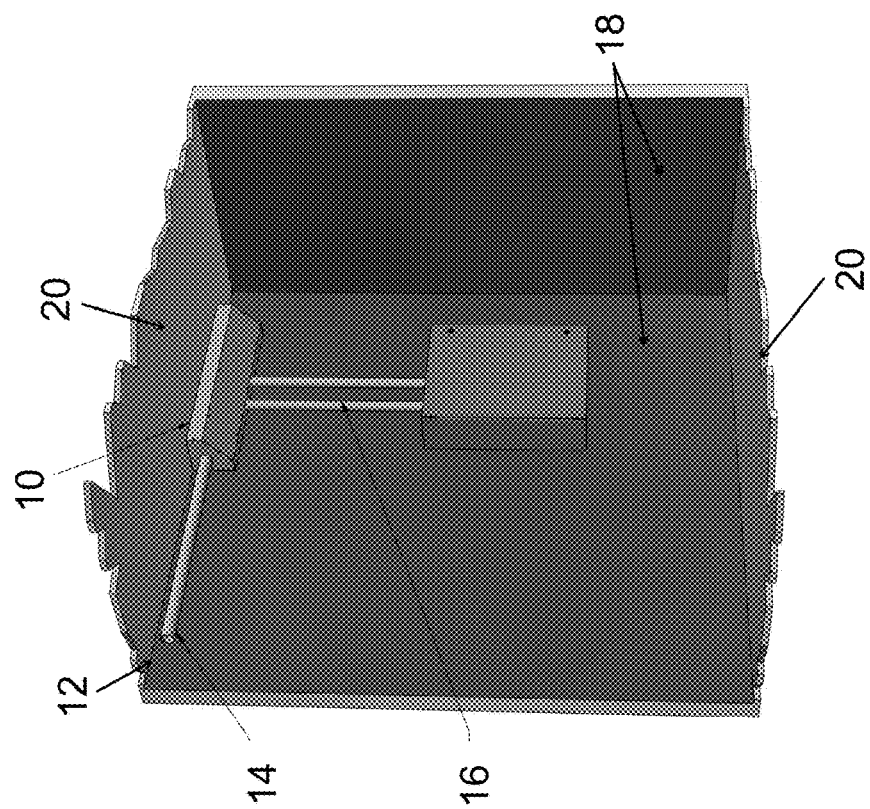
Figure 1C:
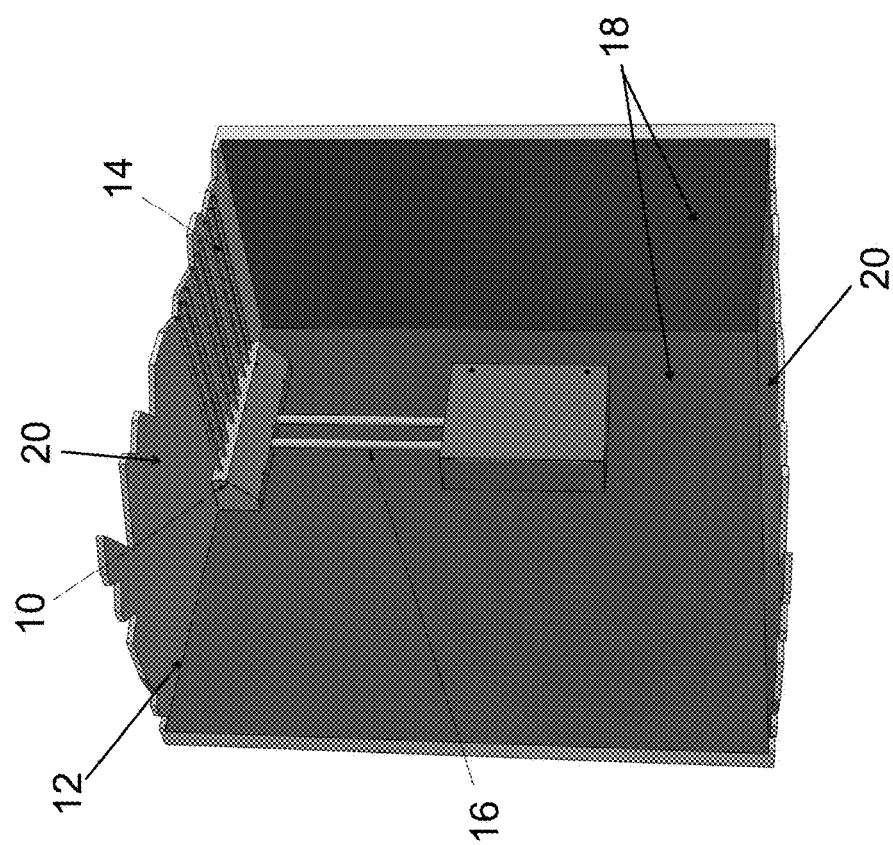

In the embodiment of FIGS. 1a and 1b, corner 12 is illustrated as being between two vertical surfaces 18 (e.g., walls). In the embodiment of FIGS. 1c and 1d, corner 12 is illustrated as being between the vertical surface 18 (e.g., wall) and a horizontal surface 20 (e.g., ceiling, floor, etc).

Trough 10 can be secured to surfaces 18, 20 in any desired manner known to those of ordinary skill in the art. Trough 10 can be made of any desired material having sufficient strength and rigidity to cover and/or shield the wires and connections placed therein. In some embodiments, trough 10 is formed carbon steel or galvanized steel. In some embodiments, trough 10 can be painted or powder coated as needed.

Figure 2:
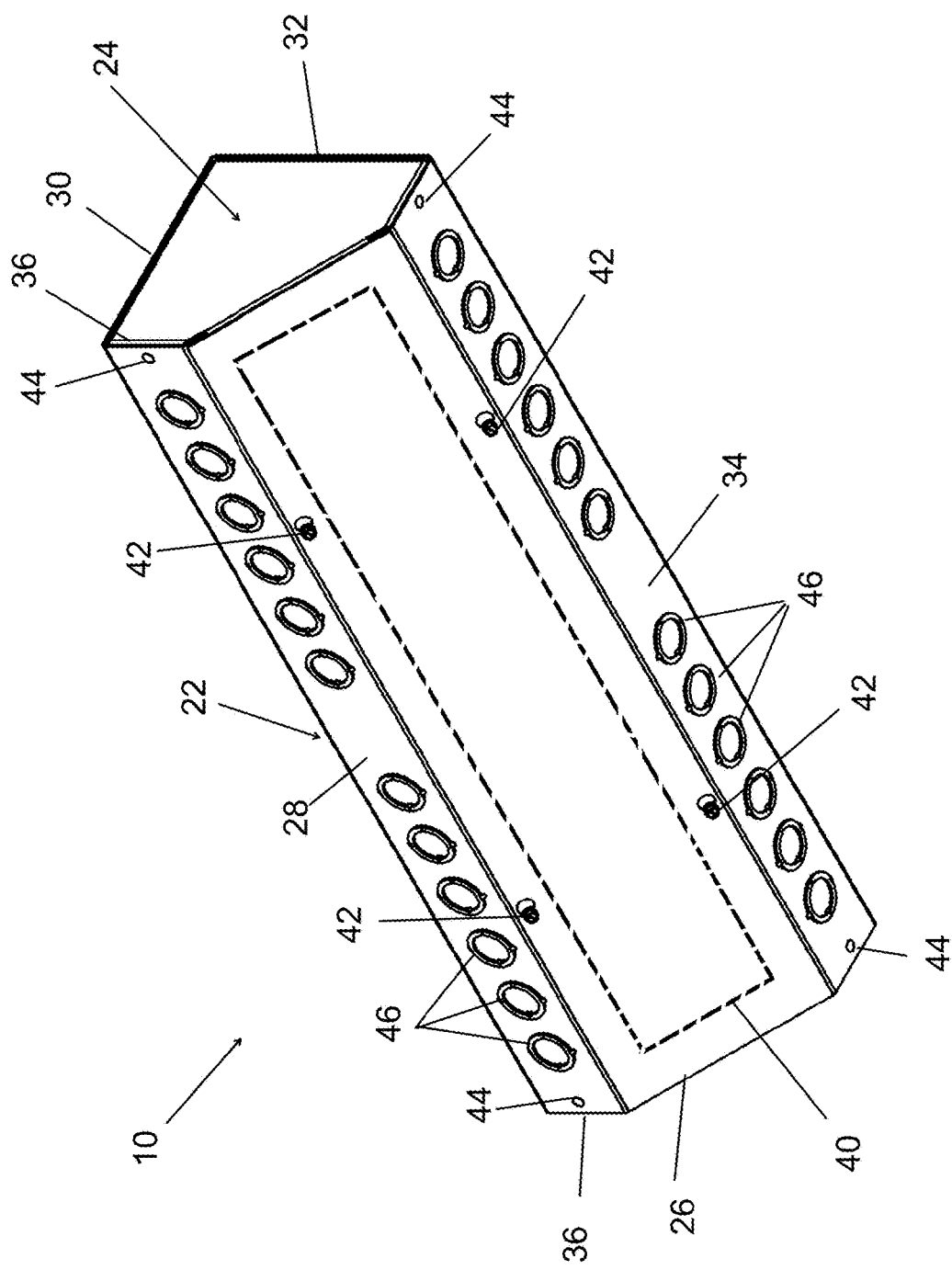
FIG. 2 is a perspective view of the wire trough of FIGS. 1a-1d.
Figure 3:
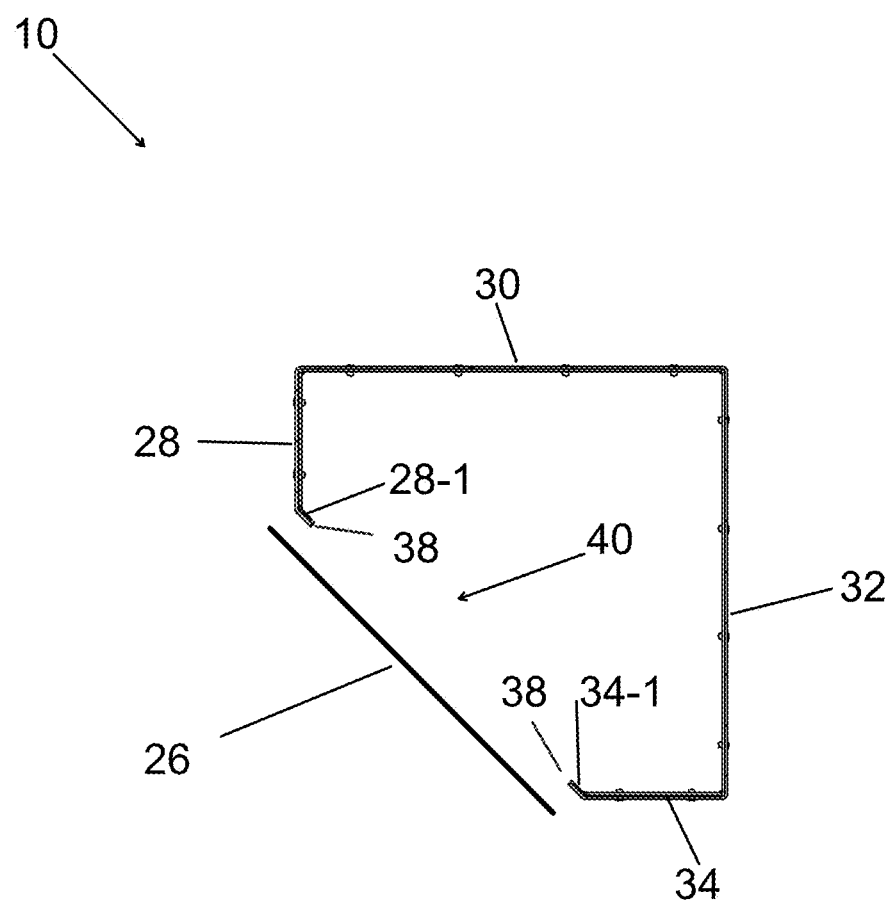
FIG. 3 is a section view of the wire trough of FIG. 2 in a partially disassemble state.

Trough 10 is described in more detail with simultaneous reference to FIGS. 2-3.

Trough 10 includes a main body 22, one or more end caps 24, and a cover 26. Main body 22 defines four longitudinally extending walls 28, 30, 32, 34 of the trough having ends 36 and defining an access opening 40 (shown in phantom in FIG. 2) between edges 38 of walls 28, 34.

Cover 26 is secured to trough 10 to selectively close opening 40. In the illustrated embodiment, cover 26 is removably secured to body 22 by a combination of one or more fasteners 42. Here, body 22 includes inwardly bent regions 28-1, 34-1 depending from walls 28, 34, respectively, and cover 26 is secured to these regions.

Figure 5:
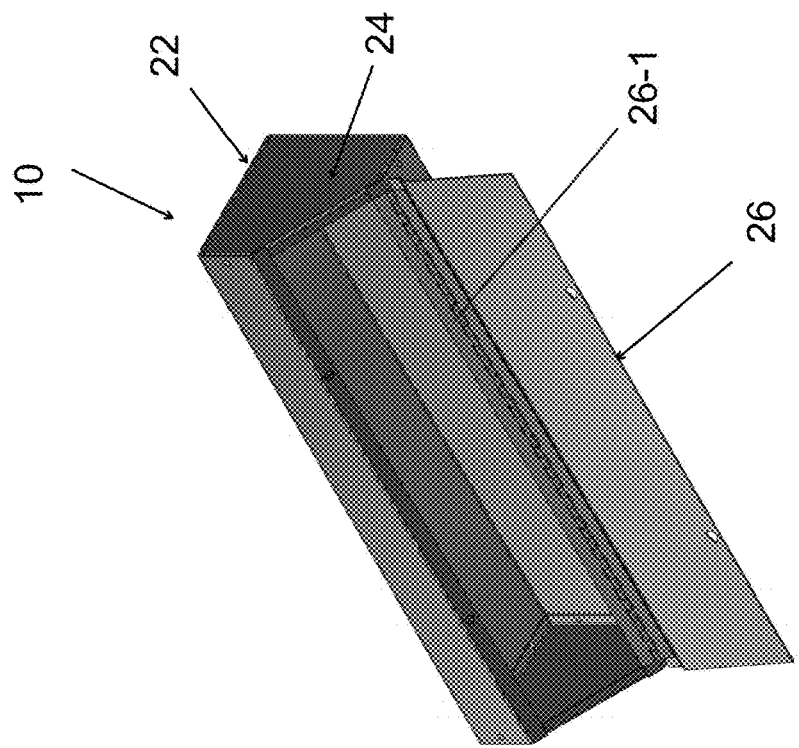
FIG. 5 is a perspective view of the wire trough of FIG. 4 having the alternate cover in an open state.
Figure 4:
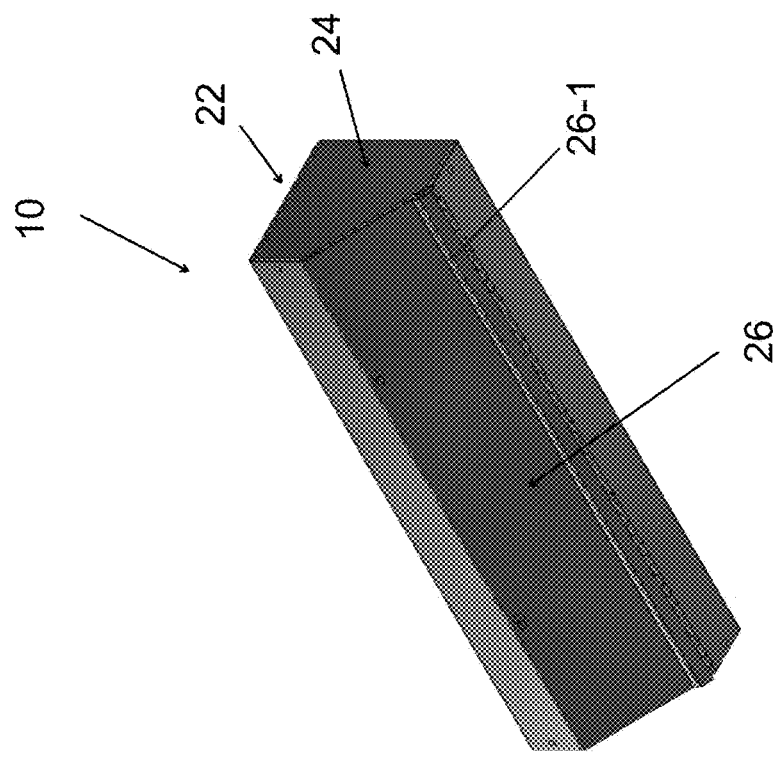
FIG. 4 is a perspective view of the wire trough of FIG. 2 having an alternate cover in a closed state.

Of course, it is contemplated for cover 26 to be secured to body 22 and/or caps 24 in any desired manner sufficient to allow selective opening/closing of opening 40. For example, it is contemplated for cover 26 to include a hinge 26' as shown in FIGS. 4-5.

Caps 24 can be secured to body 22 to close one or both ends 36 in any desired manner. Caps 24 are illustrated as angled or truncated caps, namely having a generally parallelogram shape (i.e., square or rectangular) with one corner angled or truncated as shown in FIG. 2. Also in the illustrated embodiment, caps 24 are removably secured to body 22 by one or more fasteners 44. In some embodiments, caps 24 are formed integrally with body 22. In other embodiments, caps 24 are secured, removably or otherwise, to body 22.

Trough 10 can include one or more knockouts 46 on main body 22, end caps 24, or cover 26. In the illustrated embodiment, knockouts 46 are illustrated on walls 28, 30 of main body 22. Of course, it is also contemplated by the present disclosure for the knockouts to be on walls 30 and/or 32.

Figure 7:
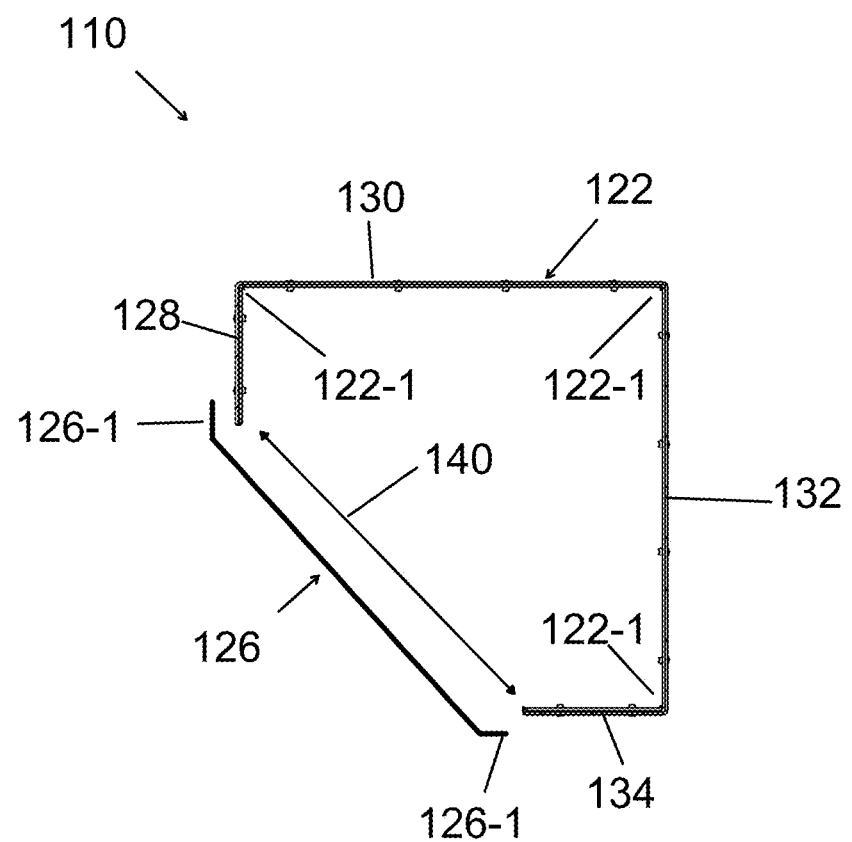
FIG. 7 is a sectional view of the wire trough of FIG. 6 in a partially disassemble state.
Figure 8:
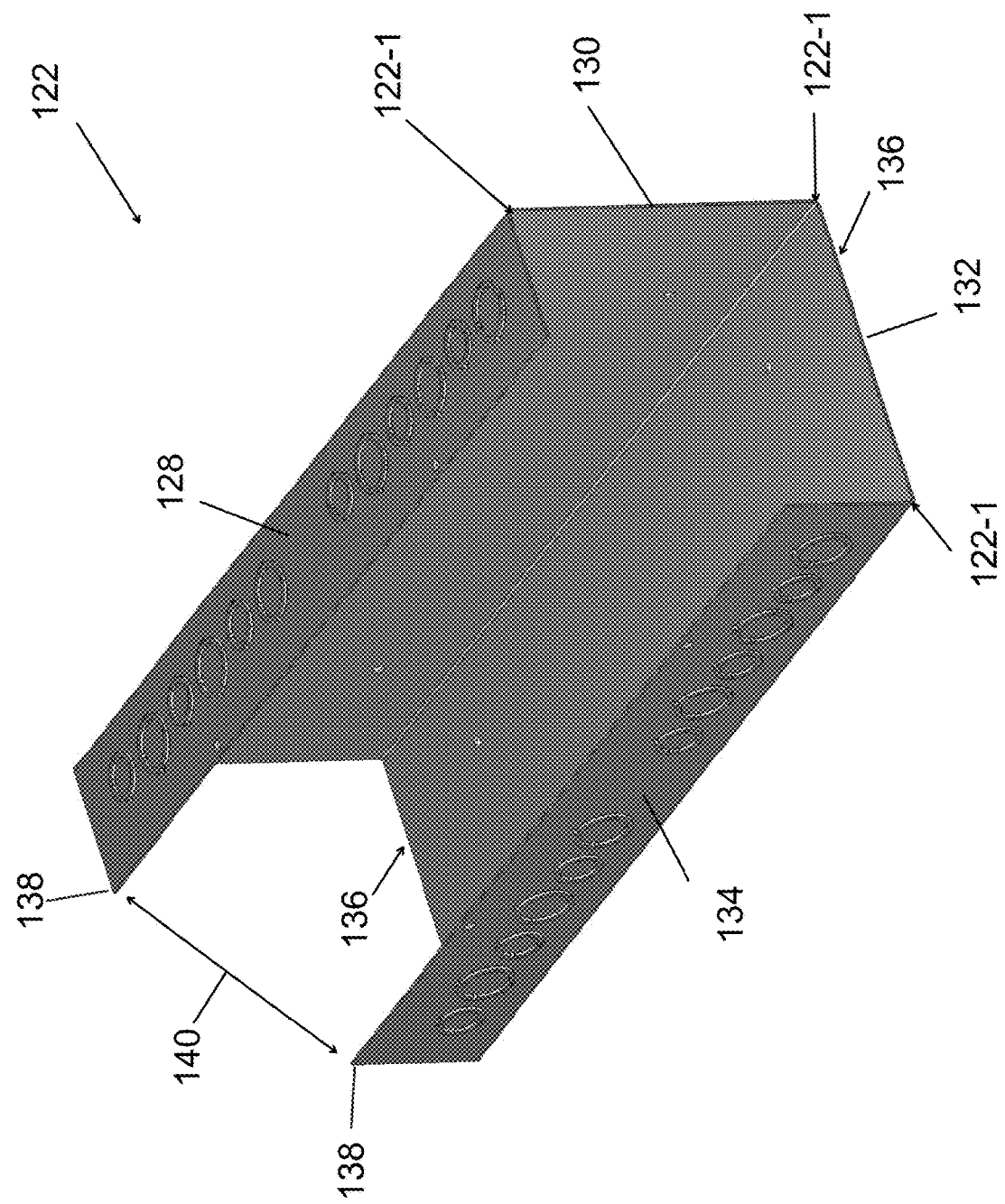
FIG. 8 is a perspective view of a main body of the wire trough in FIG. 6.

It is recognized by the present disclosure that access into opening 40 and the useable volume within trough 10 can be limited by inwardly bent regions 28-1, 34-1 depending from walls 28, 34. Thus, another exemplary embodiment of a trough according to the present disclosure is illustrated with simultaneous reference to FIGS. 6-8 and generally referred to by reference numeral 110. Here, component parts of trough 110 performing similar and/or analogous functions to those of trough 10 are labeled in multiples of one hundred.

For reasons of brevity, only those features necessary for the understanding of the differences of trough 110 are described herein below.

Trough 110 includes a main body 122, one or more end caps 124, and a cover 126. Main body 122 defines four longitudinally extending walls 128, 130, 132, 134 of the trough having ends 136 and defining an access opening 140 between edges 138 of walls 128, 134.

Main body 122 is of simple construction, namely requires only three angled regions which are illustrated as corners 122-1. In some embodiments, corners 122-1 are each ninety degrees so that adjacent walls 128, 130, 132, 134 are perpendicular to one another. Of course, it is contemplated by the present disclosure for corners 122-1 to have any desired angle.

Here, main body 122 lacks the inwardly bent regions 28-1, 34-1 depending from walls 28, 34 of trough 10. Rather, cover 126 includes bent regions 126-1. Cover 126 is secured to trough 110 to selectively close opening 140 by securing at least one of bent regions 126-1 to walls 128, 134 on main body 122.

In this manner, main body 122 provides a larger, unrestricted opening 140. Rather, opening 140 is bounded by the edges 138 of walls 128, 134 and caps 124 without restriction of any connecting features of cover 126 as in trough 10.

Figure 6:
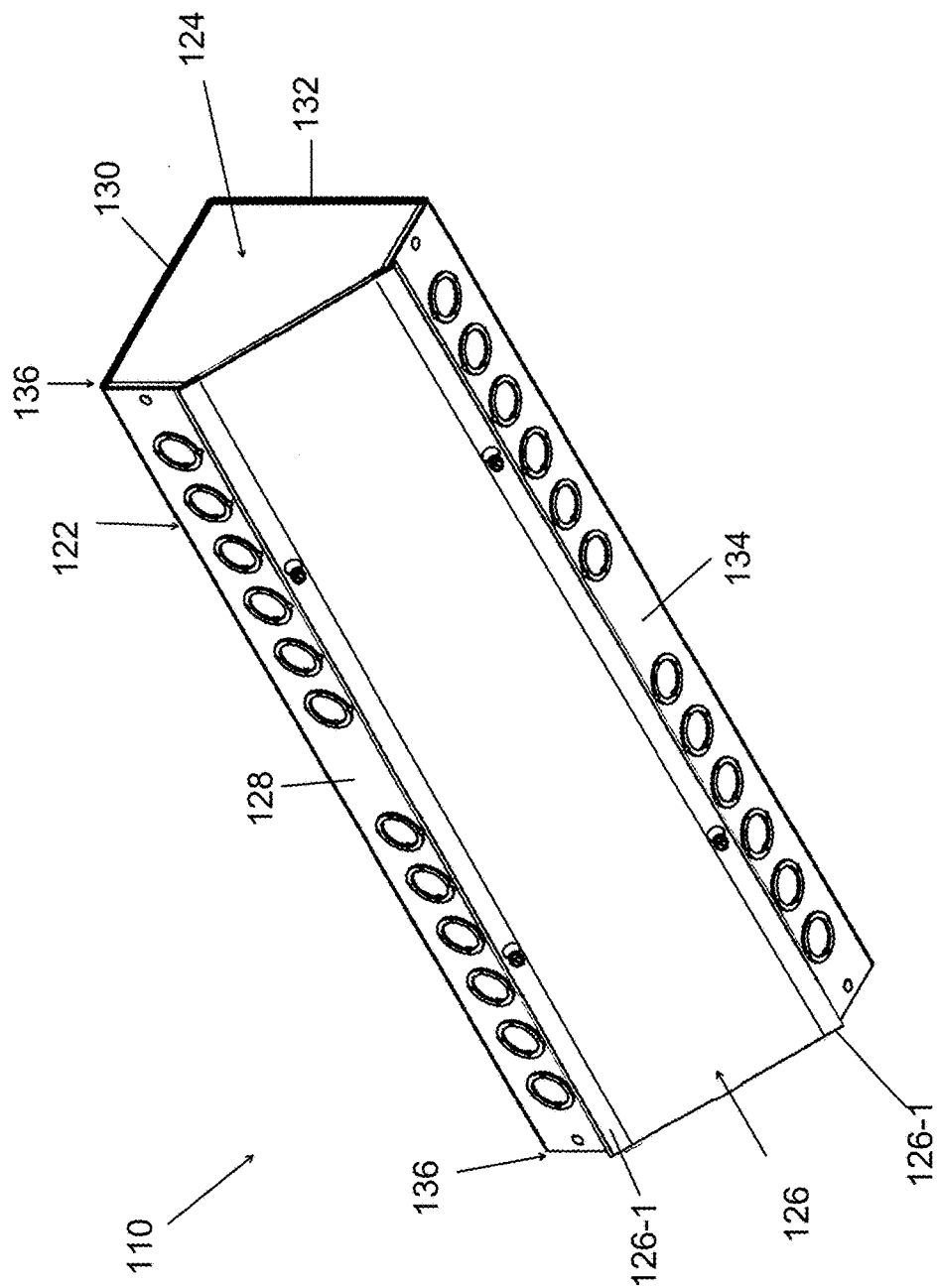
FIG. 6 is a perspective view of an alternate embodiment of the wire trough of FIGS. 1a-1d.

Caps 124 can be secured to body 122 to close one or both ends 136 in any desired manner. Caps 24 are illustrated as angled or truncated caps, namely having a generally parallelogram shape (i.e., square or rectangular) with one corner angled or truncated as shown in FIG. 6.

Figure 10:
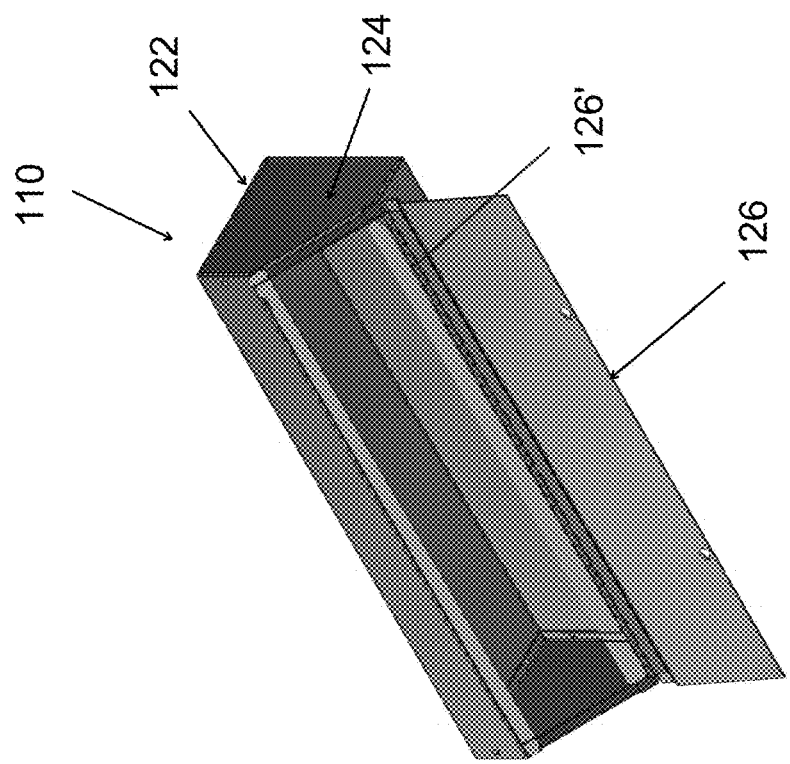
FIG. 10 is a perspective view of the wire trough of FIG. 9 having the alternate cover in an open state.
Figure 9:
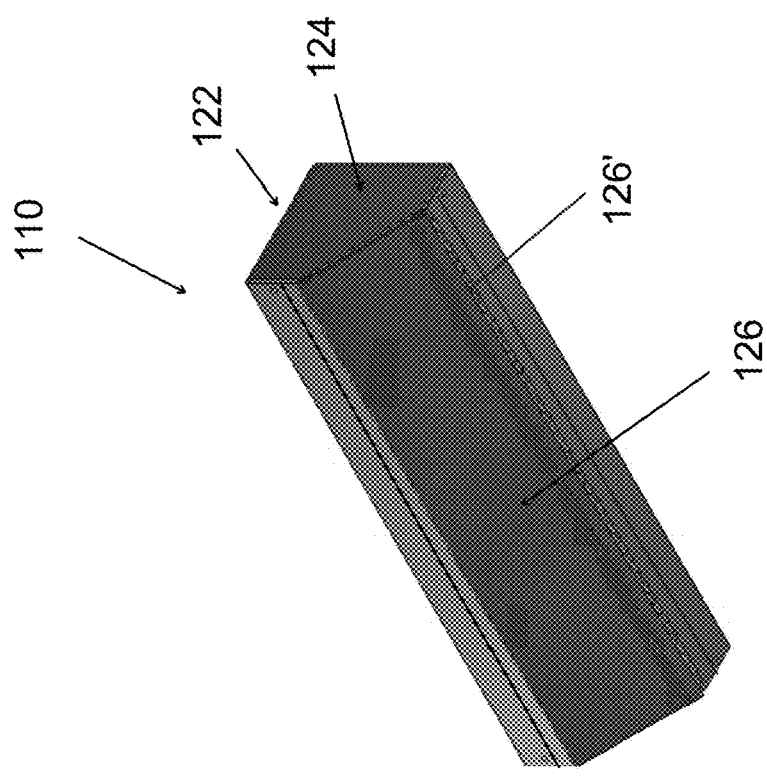
FIG. 9 is a perspective view of the wire trough of FIG. 6 having an alternate cover in a closed state.
Figure 11:
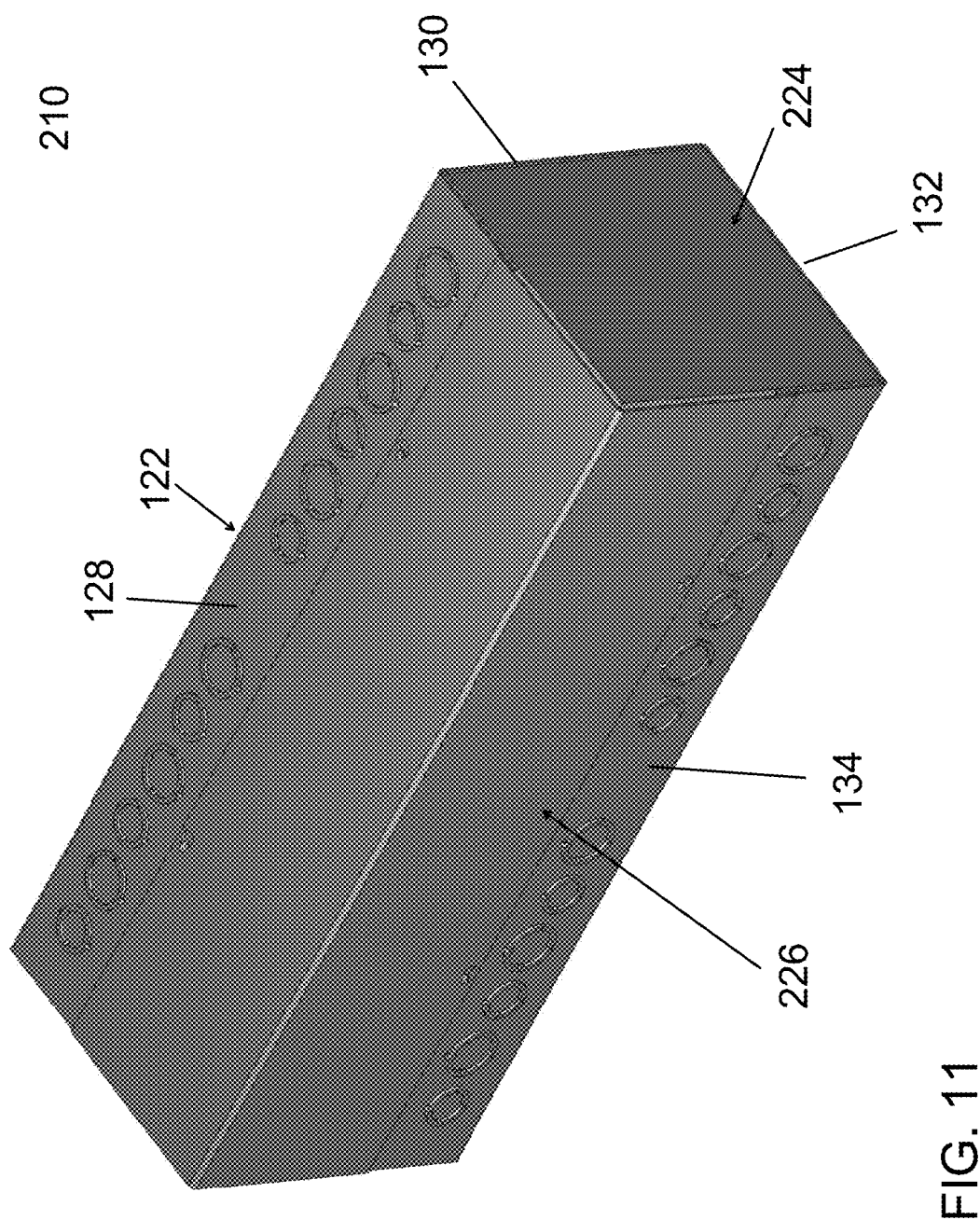
FIG. 11 is a perspective view of an alternate embodiment of the wire trough of FIGS. 1a-1d.
Figure 12:
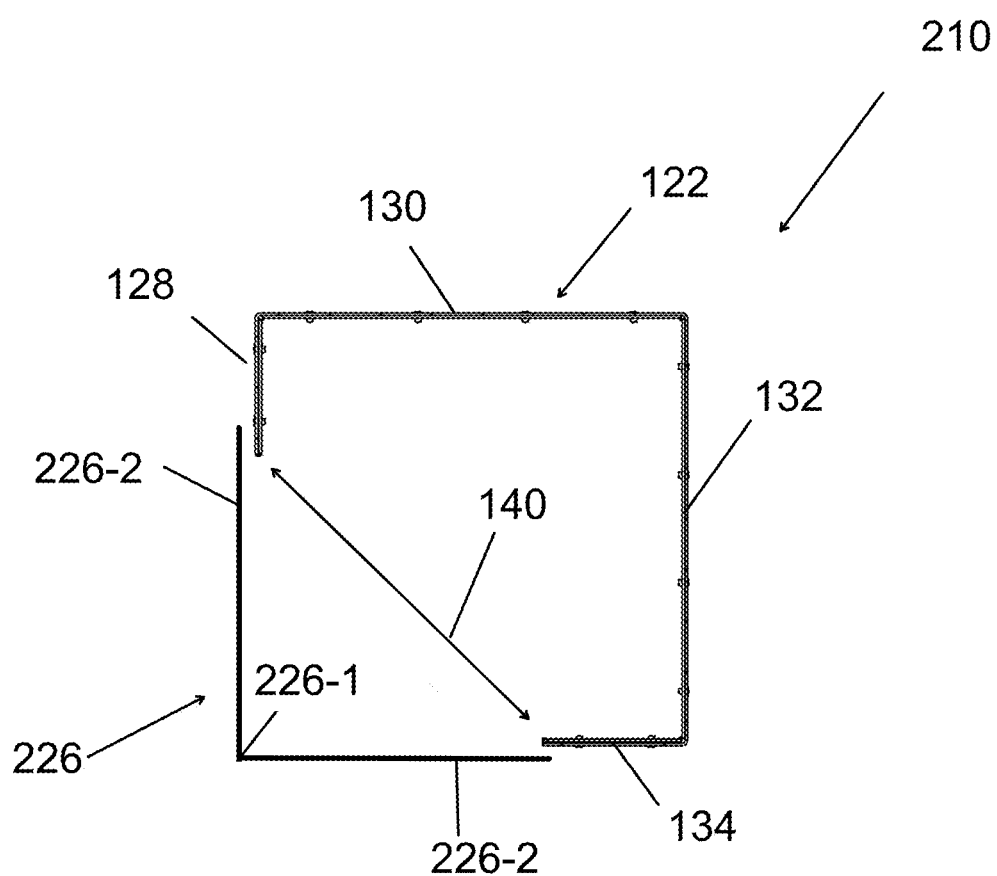
FIG. 12 is a sectional view of the wire trough of FIG. 11 in a partially disassemble state.
Figure 13:
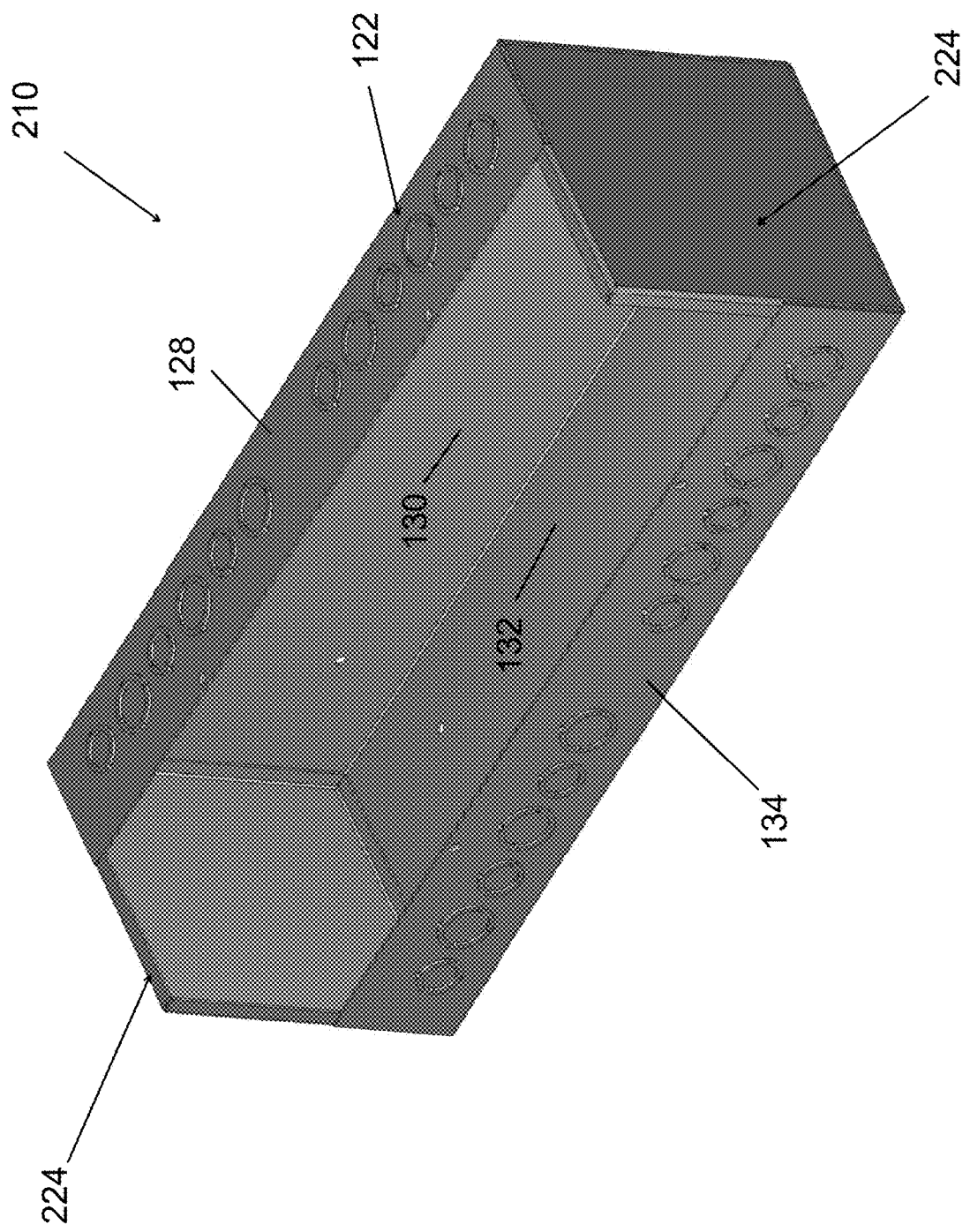
FIG. 13 is a perspective view of the wire trough of FIG. 11 with a cover removed.

Of course, it is contemplated for cover 126 to be secured to body 122 and/or caps 124 in any desired manner sufficient to allow selective opening/closing of opening 140. For example, it is contemplated for cover 126 to include a hinge 126' as shown in FIGS. 9-10.

In embodiments where increased volume inside of the trough is desired then possible with cover 126, main body 122 advantageously is also sized and configured for use with covers and end caps of other shapes. Thus, another exemplary embodiment of a trough according to the present disclosure is illustrated with simultaneous reference to FIGS. 11-14 and generally referred to by reference numeral 210. Here, component parts of trough 210 performing similar and/or analogous functions to those of troughs 10, 110 are labeled in multiples of two hundred.

Again and for reasons of brevity, only those features necessary for the understanding of the differences of trough 210 are described herein below.

Trough 210 makes use of main body 122 discussed in detail above. Thus, trough 210 includes main body 122, one or more end caps 224, and a cover 226.

Again, main body 122 defines four longitudinally extending walls 128, 130, 132, 134 of the trough having ends 136 and defining an access opening 140 between edges 138 of walls 128, 134. Main body 122 is of simple construction, namely requires only three angled regions which are illustrated as corners 122-1. In some embodiments, corners 122-1 are each ninety degrees so that adjacent walls 128, 130, 132, 134 are perpendicular to one another. Of course, it is contemplated by the present disclosure for corners 122-1 to have any desired angle.

Figure 14:
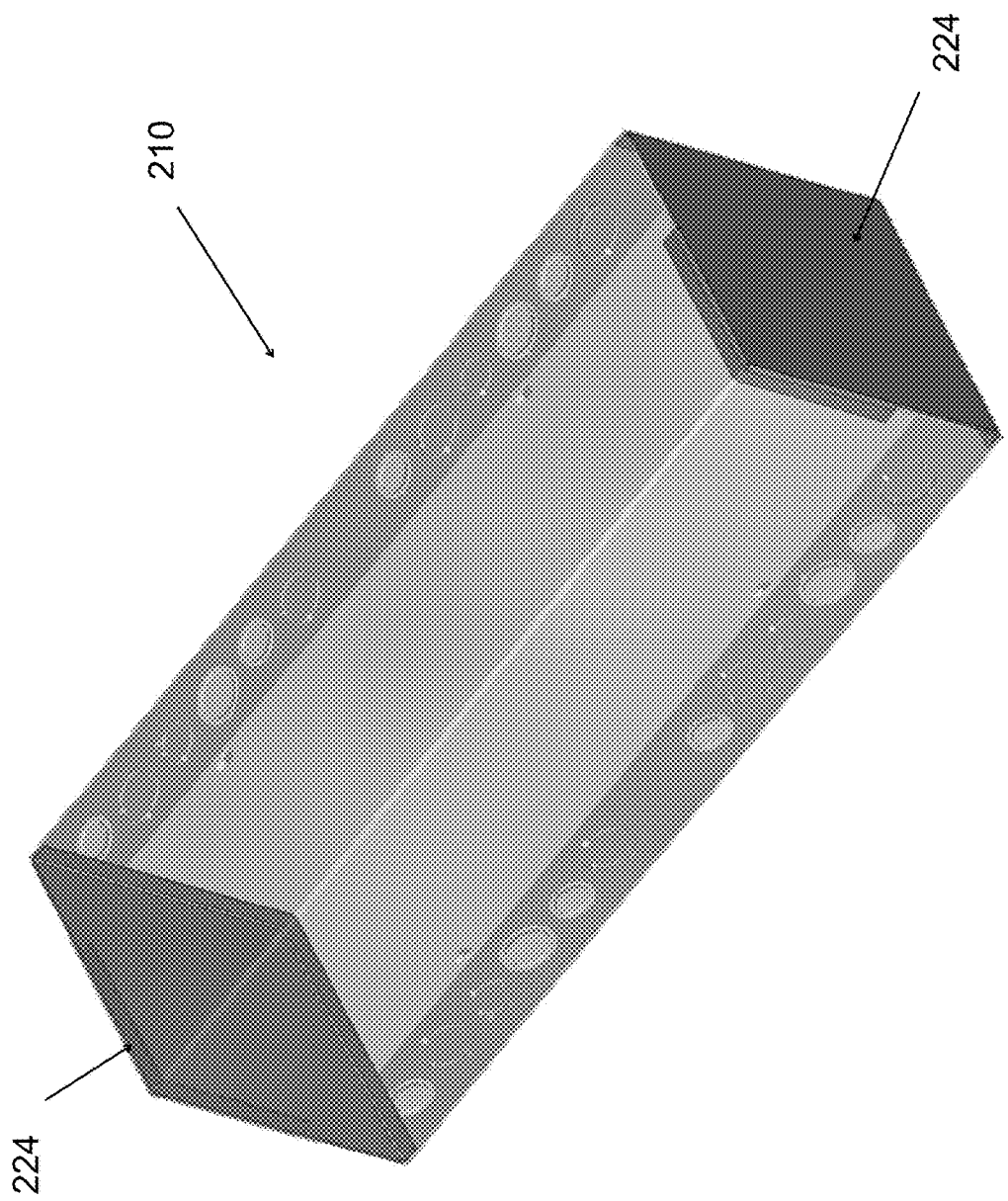
FIG. 14 is a perspective view of the wire trough of FIG. 11 with portions in phantom to illustrate the ends.
Figure 16:
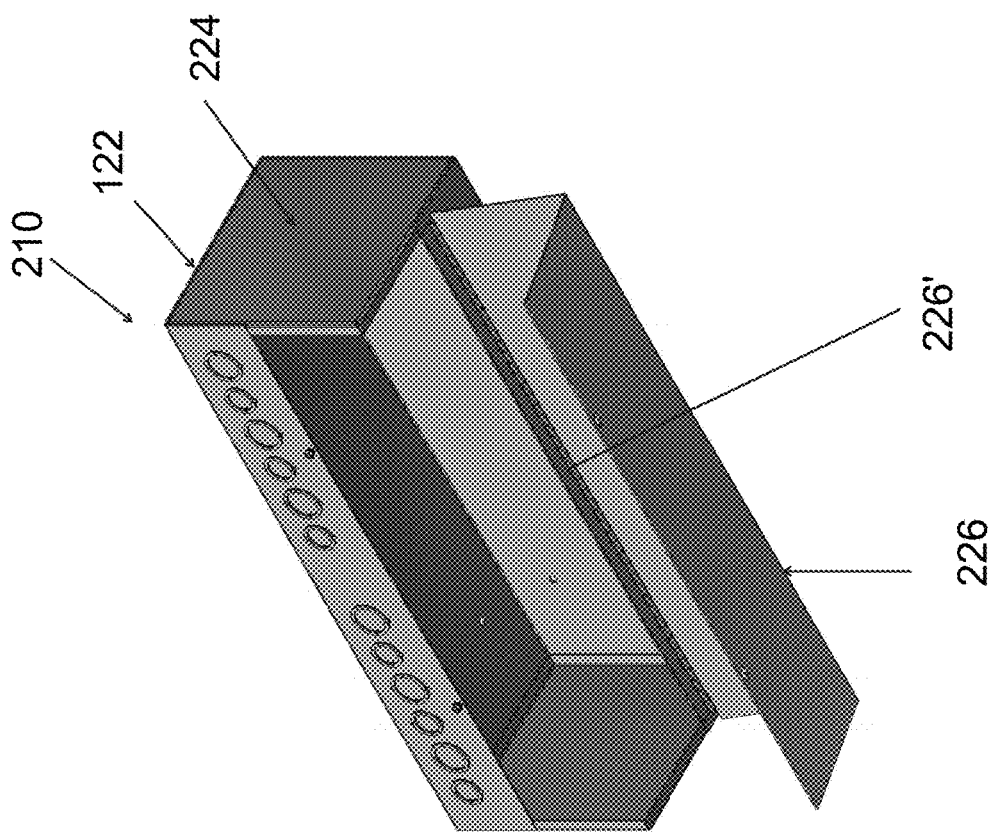
FIG. 16 is a perspective view of the wire trough of FIG. 15 having the alternate cover in an open state.

Caps 224 can be secured to body 122 to close one or both ends 136 in any desired manner. Caps 224 are illustrated as parallelogram caps (i.e., square or rectangular) as shown in FIG. 14

Cover 226 includes a bent region 226-1 defining opposite legs 226-2 of the cover. Cover 226 is secured to trough 210 to selectively close opening 140 by securing at least one of the legs 226-2 to walls 128, 134 on main body 122.

In some embodiments, cover 226 is of simple construction, namely requires only one bent region 226-1. In some embodiments, bent region 226-1 is bent ninety degrees so that legs 226-2 are perpendicular to one another. Here, trough 210 provides a cross-section of generally parallelogram shape (i.e., square, rectangular).

Figure 15:
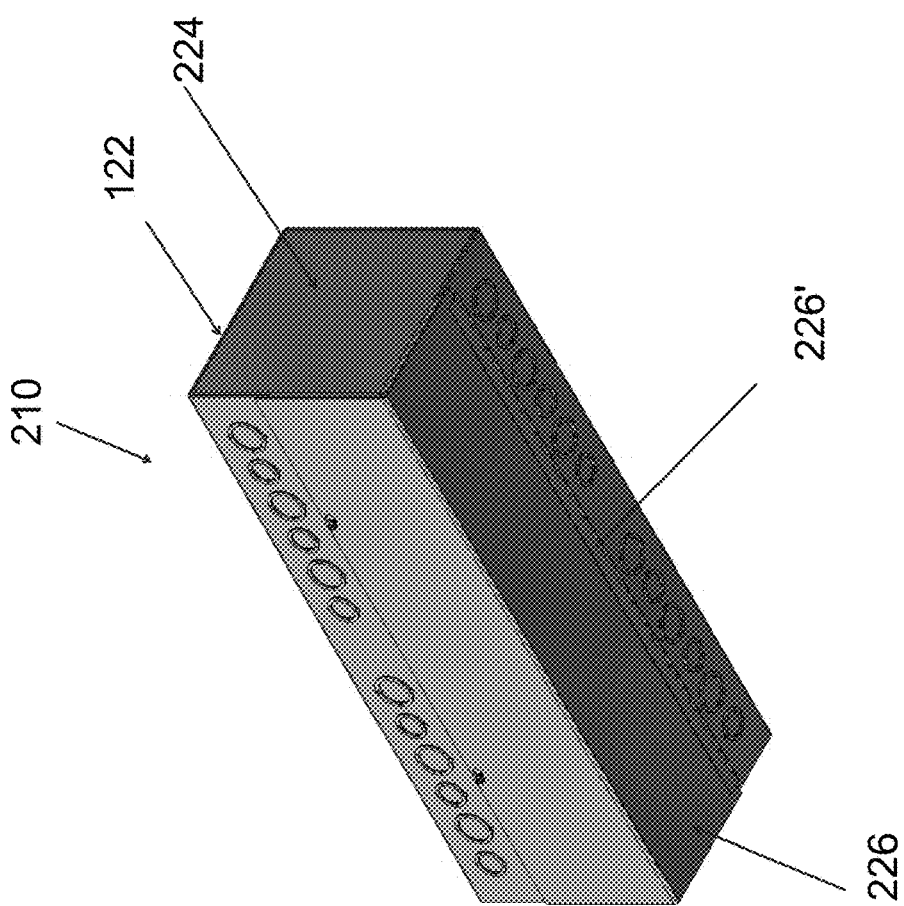
FIG. 15 is a perspective view of the wire trough of FIG. 11 having an alternate cover in a closed state.

Of course, it is contemplated by the present disclosure for bent region 226-1 to have any desired angle and/or for there to be more than one bent region to provide trough 210 of other cross-sectional shapes. For example, cover 226 can be curved so that the ends of legs 226-2 are perpendicular to one another. Additionally, it is contemplated for cover 226 to include a hinge 226' as shown in FIGS. 14-15.

In this manner, trough 210 provides the larger, unrestricted opening 140 of main body 122 and provides the additional volume from cover 226.

Moreover, main body 122 provides the ability for the user to modify the trough in the field—by simply using ends 124 and cover 126 (with or without hinge 126') or using ends 224 and cover 226 (with or without hinge 226'). The modification can be made either during installation—or even after installation in the event of expansion or contraction of the amount of required space within the trough.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

wire trough 10
inside corner 12
first conduits 14
second conduits 16
vertical surface 18
horizontal surface 20
main body 22
end cap 24
cover 26
cover hinge 26'
trough walls 28, 30, 32, 34
trough ends 36
wall edges 38
access opening 40
fasteners 42
bent regions 28-1, 34-1
fasteners 44
knockouts 46
wire trough 110
main body 122
end cap 124
cover 126
cover hinge 126'
trough walls 128, 130, 132, 134
trough ends 136
wall edges 138
access opening 140
corners 122-1
bent regions 126-1
wire trough 210
end cap 224
cover 226
cover hinge 226'
bent region 226-1
cover legs 226-2

What is claimed is:

1. A wire trough, comprising:
a main body having four longitudinally extending walls defining an access opening between edges of two of the four walls, wherein the edges of the two of the four walls each further comprise an inwardly bent region, the inwardly bent region extending along an entirety of the main body;
caps inserted into and closing ends of the main body at inner surfaces of the four longitudinally extending walls and the inwardly bent region of the two of the four walls; and
a cover to selectively close the access opening.

2. The wire trough of claim 1, wherein the caps are are removably secured to the main body.

3. The wire trough of claim 1, further comprising one or more knockouts on the main body, the cap, the cover, and any combinations thereof.

4. The wire trough of claim 1, wherein the main body comprises only three angled regions.

5. The wire trough of claim 4, wherein the three angled regions are each ninety degrees.

6. The wire trough of claim 1, wherein the cover comprises two bent regions that are secured to the two of the two of the four walls defining the edges.

7. The wire trough of claim 6, wherein the caps are angled caps.

8. The wire trough of claim 6, wherein the cover comprises a hinge.

9. The wire trough of claim 1, wherein the cover has a single ninety degree bend defining legs that are perpendicular to one another, the legs being secured to the two of the two of the four walls defining the edges.

10. The wire trough of claim 9, wherein the caps are parallelogram caps.

11. The wire trough of claim 9, wherein the cover comprises a hinge.

12. The wire trough of claim 1, wherein the main body, caps, and cover are formed of carbon steel or galvanized steel.

13. The wire trough of claim 12, wherein the main body, caps, and cover further comprise paint or powder coating.

14. A wire trough, comprising:
a main body consisting of four longitudinally extending walls defining an access opening between edges of two of the four walls, wherein the four longitudinally extending walls have three corners each at ninety degrees so that adjacent walls are perpendicular to one another and, wherein the edges of the two of the four walls each further comprise an inwardly bent region, the inwardly bent region extending along an entirety of the main body;
caps inserted into and closing ends of the main body at inner surfaces of the four longitudinally extending walls and the inwardly bent region of the two of the four walls; and
a cover securable to the main body to selectively close the access opening.

15. The wire trough of claim 14, wherein the caps are angled caps and the cover comprises a pair of bent regions, the pair of bent regions being secured to the two of the two of the four walls defining the edges.

16. The wire trough of claim 15, wherein the cover comprises a hinge.

17. The wire trough of claim 14, wherein the caps are parallelogram caps and the cover has a single ninety degree bend defining legs that are perpendicular to one another, the legs being secured to the two of the two of the four walls defining the edges.

18. The wire trough of claim 17, wherein the cover comprises a hinge.

19. The wire trough of claim 14, wherein the main body is configured to selectively receive either angled caps and the cover comprising a pair of bent regions secured to the two of the two of the four walls defining the edges to define an angled trough or parallelogram caps and the cover having a single ninety degree bend defining legs that are perpendicular to one another and secured to the two of the two of the four walls defining the edges to define a parallelogram trough.

20. The wire trough of claim 14, further comprising one or more knockouts on main body, the cap, the cover, and any combinations thereof.

* * * * *